Sept. 24, 1940.   C. S. BRAGG ET AL   2,215,732
BRAKE
Filed June 25, 1938   6 Sheets-Sheet 1

INVENTORS.
CALEB S. BRAGG
ROBERT P. BREESE
Jerome R. Cox
ATTORNEY.

Sept. 24, 1940.  C. S. BRAGG ET AL  2,215,732
BRAKE
Filed June 25, 1938  6 Sheets-Sheet 2

INVENTOR.
CALEB S. BRAGG
ROBERT P. BREESE
Jerome R. Cox
ATTORNEY.

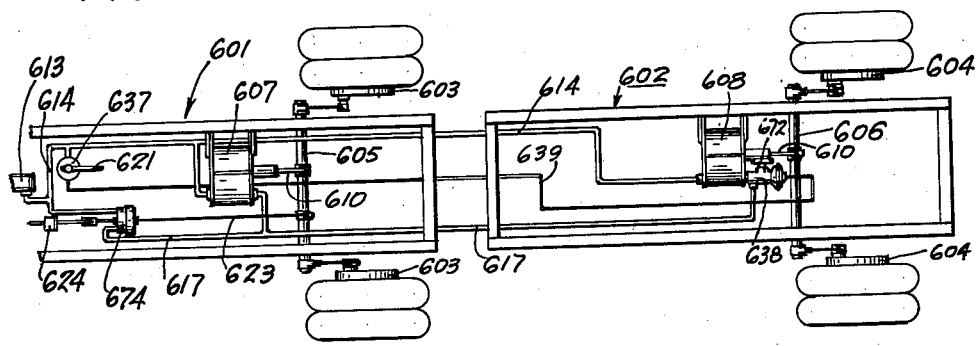

Sept. 24, 1940.   C. S. BRAGG ET AL   2,215,732
BRAKE
Filed June 25, 1938   6 Sheets-Sheet 5

INVENTORS.
CALEB S. BRAGG
ROBERT P. BREESE
BY
Jerome R. Cox
ATTORNEY.

Sept. 24, 1940.   C. S. BRAGG ET AL   2,215,732
BRAKE
Filed June 25, 1938   6 Sheets-Sheet 6

INVENTORS.
CALEB S. BRAGG
BY ROBERT P. BREESE
Jerome R. Cox
ATTORNEY.

Patented Sept. 24, 1940

2,215,732

UNITED STATES PATENT OFFICE 2,215,732

BRAKE

Caleb S. Bragg, Palm Beach, Fla., and Robert P. Breese, New York, N. Y., assignors to Bendix Products Corporation, South Bend, Ind., a corporation of Indiana Application June 25, 1938, Serial No. 215,780

19 Claims. (Cl. 188—3)

This invention relates to power brakes and more particularly to power brake systems for tractor-trailer combinations.

We have found it desirable to enable the operator of tractor-trailer combinations equipped with power brakes to operate the trailer brakes substantially independently of the tractor brakes, and at the same time we have found it desirable that the tractor and trailer brakes be operable simultaneously by the usual means, such as the brake pedal of the tractor.

Consequently an object of this invention is to provide independently operable means for controlling the trailer power brakes alone.

Another object is to provide independently operable means for controlling the trailer power brakes alone, combined with means for simultaneously controlling both the tractor power brakes and the trailer power brakes.

Another object is to provide dual control means for trailer power brakes selectively operable independently of the other.

We have found several ways to accomplish the above objects and believe that some of these ways, further objects, and many desirable particular arrangements of parts will become apparent upon reference to the following detailed description of the several illustrative embodiments shown in the accompanying drawings, in which:

Figure 9 is a view similar to Figure 1 of another modified vacuum-suspended system;

Figure 10 is a longitudinal section through a relay valve suitable for use in the systems of Figures 4, 5 and 6;

Figure 10A is a section through another relay valve suitable for use in the systems of Figures 7, 8 and 9;

Figure 1:
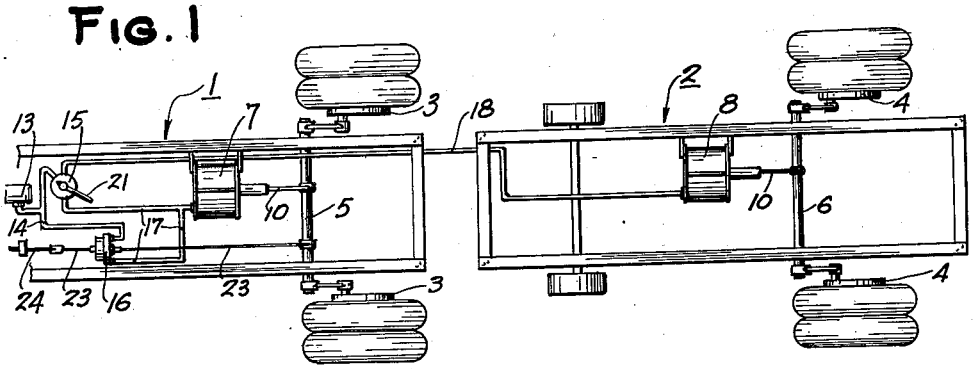
Figure 1 is a diagrammatic partial plan view of a tractor and trailer with air-suspended vacuum power brakes arranged according to our invention.
Figure 11:
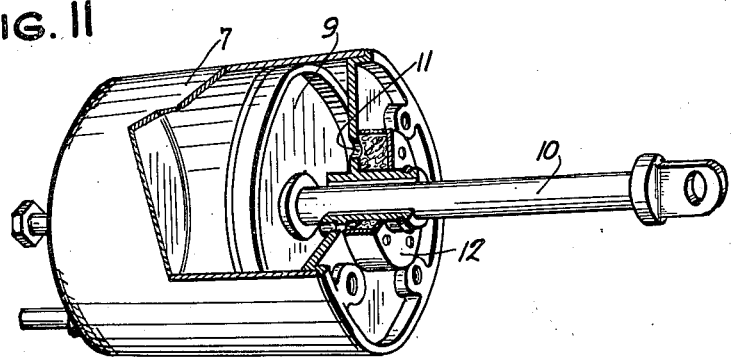
Figure 11 is a perspective view, broken away to show parts in section, of a power cylinder suitable for use in the systems of Figures 1, 4, 5 and 6.

Referring to Figure 1, there is shown a tractor 1 and a trailer 2 provided respectively with wheel brakes 3 and 4 arranged to be applied by the rotation of cross shafts 5 and 6. The tractor and trailer are provided respectively with power cylinders 7 and 8 of the air-suspended type shown in detail in Figure 11. These cylinders contain pistons 9 connected to piston rods 10 which in turn are connected to the respective cross shafts 5 and 6 and adapted to rotate them to apply the brakes. The cylinders are provided at their rearward ends with air ports 11 (Figure 11) covered by air cleaners 12.

The usual internal combustion motor of the tractor 1 has the usual intake manifold 13 providing a source of vacuum which is conducted by a branching conduit 14 to a hand control valve 15 and a pedal control valve 16. The pedal control valve has a controlled pressure conduit 17 extending from it which has one branch leading to the forward end of the tractor power cylinder 7 and another leading to one part of the hand control valve 15. The hand control valve has a third conduit 18 extending from it and leading to the forward end of the trailer power cylinder 8.

Figure 2:
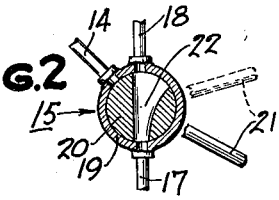
Figures 2 and 3 are transverse sectional views of a three-way control valve suitable for use in the system of Figure 1, showing the valve in its two extreme positions.
Figure 3:
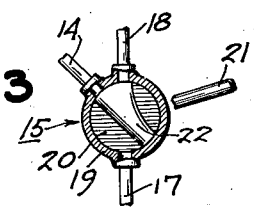

Referring to Figures 2 and 3, the hand control valve comprises a circular casing 19 containing a cylindrical plug valve member 20 adapted to be rotated by a hand lever 21. The conduits 17 and 18 enter the casing 19 at diametrically opposite points and are connected by a passage 22 in the plug member 20 when the valve is in the "off" position (Figure 2). The conduit 14 enters the casing 19 at an angle of about 45° from the conduit 18, and the passage 22 is so formed that when the handle 21 is moved to the "on" position (Figure 3) the conduit 17 is first cut off and then the conduit 14 is opened and brought into communication with the conduit 18.

The pedal control valve may preferably be connected into a brake rod 23 extending from a foot pedal 24 to the cross shaft 5, so that, when the pedal is depressed, the valve is operated by the tension in the rod. The valve is shown in detail in Figure 13 and comprises a pair of casing shells 25 and 26 having clamped between them a diaphragm 27. In the center of the diaphragm is secured a plunger 28 extending forwardly through the casing shell 25 and secured to the forward portion of the brake rod 23. The casing shell 26 is secured to the rearward portion of the brake rod 23.

Figure 13:
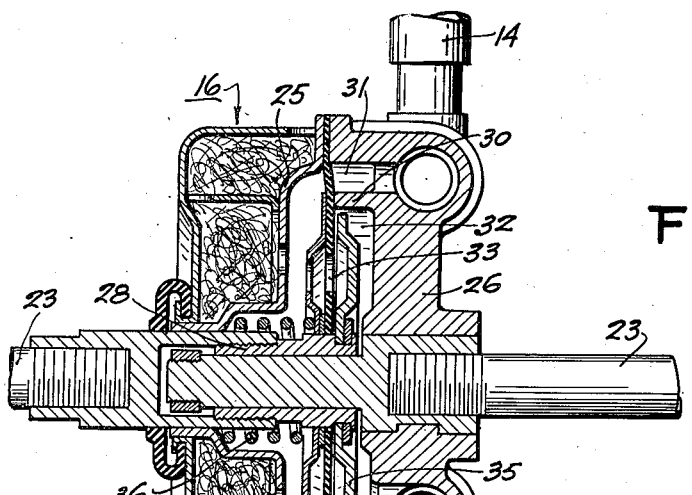
Figure 13 is a central longitudinal section through an air-suspended type pedal control valve suitable for use in the systems of Figures 1, 4, 5 and 6.

The casing shell 25 forms, with the diaphragm 27, an air chamber 28 communicating with the atmosphere through an air cleaner 29. The casing shell 26 forms, with the diaphragm 27, two annular chambers 31 and 32 separated by an annular wall 30 which is in contact with the diaphragm 27 when the valve is in released position as shown in Figure 13. The outer annular chamber 31 is the vacuum chamber and is connected to the vacuum conduit 14. The inner annular chamber 32 is the controlled pressure chamber and is connected to the conduit 17.

The diaphragm 27 is formed with an annular series of perforations 33 radially inwardly of the annular wall 30. Also the diaphragm 27 has associated with it a pair of valve discs 34 and 35 secured to the plunger 28. The disc 34 is on the air chamber side, is of greater diameter than the annular wall 30 and is perforated to correspond with the perforations 33 of the diaphragm. The other disc 35 is on the controlled pressure chamber side, is of slightly less diameter than the annular wall 30, and has no perforations.

A spring 36 acts between the casing shell 25 and the plunger 28 to move the plunger to the right, as seen in Figure 13, causing the valve disc 34 to press the diaphragm 27 against the annular wall 30, and lifting the periphery of the valve disc 35 from the diaphragm. This is the brake released position and air from the air cleaner 29 passes through the perforations of the diaphragm 27 into the controlled pressure chamber 32 and the conduit 17. When tension is applied to the brake rod 23 by depressing the pedal 24 the plunger 28 is moved to the left relative to the casing shells, the periphery of the valve disc 35 is seated against the diaphragm 27, and the diaphragm 27 is lifted from the annular wall 30, whereby the vacuum in the vacuum chamber 31 enters the controlled pressure chamber and the conduit 17.

The operation of my novel system is as follows: Assuming that the hand valve 15 and the pedal control valve 16 are both in the "off" position, the pressure in the lines 17 and 18 is atmospheric and no force is exerted on the pistons 9 of the cylinders 7 and 8 to apply the brakes of either the tractor or the trailer. Now, if it is desired to operate the trailer brakes independently of the tractor brakes, the handle 21 of the hand control valve 15 is moved toward the "on" position, cutting off the conduit 17 and causing the vacuum from the conduit 14 to enter the conduit 18 and the cylinder 8. With vacuum on the forward side of the piston 9 of the said cylinder 8, the atmospheric pressure on the rear of the pistons forces it forward to apply the trailer brakes 4. To release the brakes, the hand valve 15 is returned to the "off" position, cutting off the conduit 14 and admitting air from the conduit 17 to the conduit 18, whereupon the piston 9 returns to its initial position, releasing the trailer brakes 4.

Now, if it is desired to apply both the tractor and trailer brakes, the pedal 24 is depressed, causing the pedal control valve 16 to admit vacuum to the conduit 17 as previously described. The vacuum in the conduit 17 is transmitted directly to the forward end of the tractor power cylinder 7 to apply the tractor brakes, and also passes through the hand control valve 15 to the conduit 18 and to the trailer power cylinder 8 to apply the trailer brakes. When the pedal 24 is released, the valve 16 moves to its "off" position, admitting air to the conduit 17 in the manner previously described, and thereby releasing the brakes of the tractor and trailer.

It will be noted that, with my novel system, both controls may be operated together and both the tractor and the trailer brakes will be applied, the trailer brakes by the hand lever 21 and the tractor brakes by the foot pedal 24.

Figure 4:
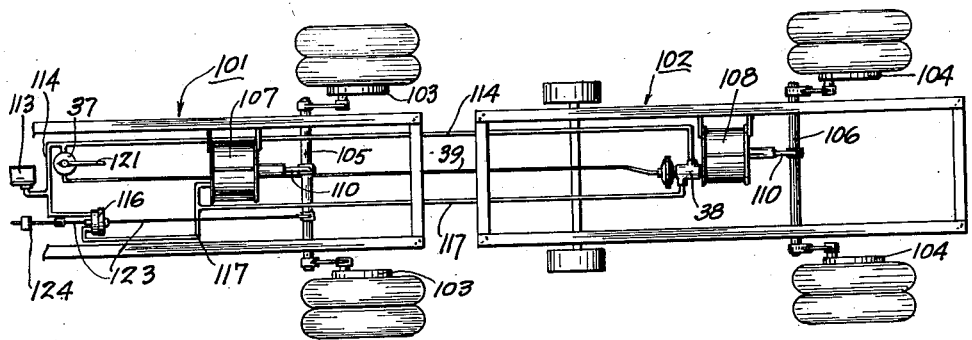
Figure 4 is a view similar to Figure 1 of a modified air-suspended system.

In the modification of Figure 4, corresponding parts have the same reference numerals plus 100. The vacuum line 114 has three branches, one leading to the pedal control valve 116, another leading to a different type of hand valve 37 which will be described below, and a third leading to a relay valve 38 mounted on the trailer power cylinder 108. This relay valve will also be described subsequently. The hand control valve 37 has a controlled pressure line 39 leading from it to the relay valve 38, and the controlled pressure line 35 from the pedal control valve 116 also leads to the relay valve 38 and to the forward end of the tractor power cylinder 107.

Figure 12:
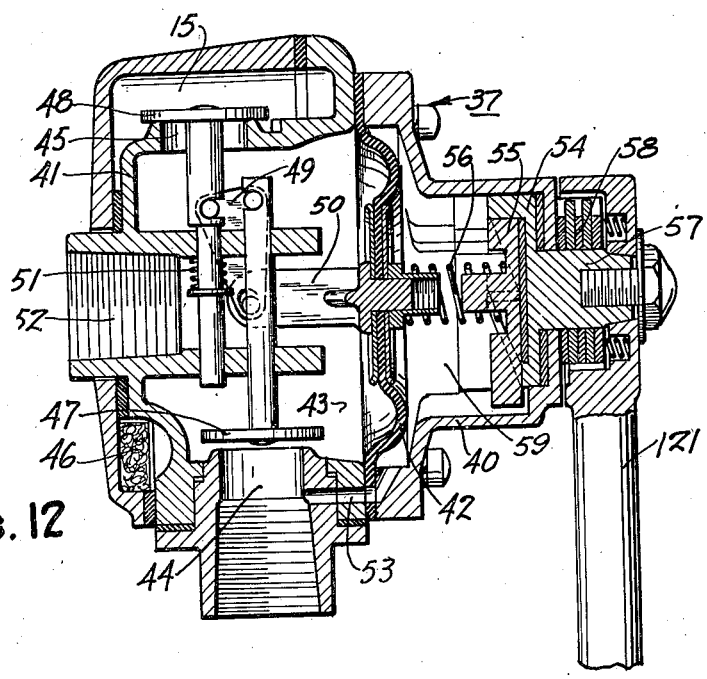
Figure 12 is a central longitudinal section through a hand control valve suitable for use in the systems of Figures 4, 5, 6, 7, 8 and 9.

The hand control valve 37 is shown in detail in Figure 12 and comprises a pair of body shells 40 and 41 having clamped between them the periphery of a diaphragm 42. The diaphragm 42 and the casing shell 41 form between them a controlled pressure chamber 43 having a vacuum port 44 connected to the vacuum line 14, and an air port 45 communicating with an integrally formed air cleaner 46. The vacuum port 44 and the air port 45 are closed respectively by poppet valves 47 and 48, each of which is operatively engaged by a floating bell crank lever 49. The lever 49 is also connected to a yoke 50 floatingly supported at the center of the diaphragm 42. A coil spring 51 biases the air port valve 48 towards closed position, and the mechanism is so arranged that when the diaphragm is depressed, the vacuum port valve 47 closes and then the air port valve 48 opens, and when the diaphragm is raised, the air port valve 48 closes and the vacuum valve 47 opens. In an intermediate position which is called "lapped" position, both valves may be closed. A port 52 leads from the controlled pressure chamber 43 to the controlled pressure line 39 previously described.

The casing shell 40 and the diaphragm 42 form between them a chamber 59 which is open to the vacuum from the line 114 through a passage 53. Within this chamber is a cam 54 operating upon a cam follower 55 and adapted, upon being rotated, to move the cam follower toward and away from the diaphragm 42. A coiled compression spring 56 is interposed between the cam follower 55 and the center of the diaphragm 42 so that movement of the cam follower exerts or relieves a force on the diaphragm through the medium of the spring. The cam 54 has a stem 57 which extends outside of the casing shell 40 through suitable packings 58 and to which a hand control lever 121 is secured.

For operation in an air-suspended system such as the one being described, the hand control valve 37 is shown in Figure 12 as being in the "on" position with the handle 121 rotated fully to the left to completely relieve the pressure of the spring 56 on the diaphragm 42, whereupon the vacuum in the chamber 59 lifts the diaphragm. As previously described, the lifting of the diaphragm first closes the air port valve 48 and then opens the vacuum port valve 47 admitting vacuum from the vacuum port 44 to the controlled pressure chamber 43. When the vacuum in the controlled pressure chamber 43 equals the vacuum in the chamber 59, the valves move to "lapped" position.

Now, as the lever 121 is moved to the right, the increasing pressure of the spring 56 moves the diaphragm down to admit air through the port 45 to balance the spring pressure. When the lever 121 reaches "off" position, the pressure of the spring 56 is sufficient to admit full atmospheric pressure to the controlled pressure chamber 42.

The relay valve 38 is shown in detail in Figure 10 and comprises a body 60 and a cover 61 having clamped between them a diaphragm 62. The body 60 is formed with a longitudinal cylindrical bore 63 in which is slidably mounted a hollow cylindrical plunger 64 secured at one end to the center of the diaphragm 62. The bore 63 has an end port 65 for transmitting the relayed pressure, in the instant case, directly to the forward end of trailer power cylinder 108, and transverse ports 66 and 67.

The port 66 is a vacuum port connected to the vacuum line 114 and is opened when the plunger 64 is in the extreme left position as shown in Figure 10A. The port 67 is an air port, which is, in the instant case, connected to the pedal control valve controlled pressure line 117, and this port is opened through ports 68 formed in the walls of the hollow plunger 64 when the plunger is in the extreme right-hand position as shown in Figure 10. A passage 69 formed in the wall of the plunger 64 adjacent to its connection with the diaphragm admits the pressure in the bore 63 to the right-hand face of the diaphragm at all times.

Between the diaphragm 62 and the cover 61 is formed a controlling pressure chamber 70 having a port 71 which, in the instant case, is connected to the hand control valve controlled pressure line 39. In this chamber, compressed between the diaphragm and the cover 61, is a light compression spring 64a which normally holds the parts of the relay 38 in the position shown in the figure.

The operation of the modification of Figure 4 is as follows: with the hand control valve in the "off" position, atmospheric pressure exists in the conduit 39 and the controlling pressure chamber 70 of the relay valve 38. This pressure acting on the diaphragm 62, and combined with the pressure of the spring 64a, maintains the plunger 64 to the position of Figure 10 with the air port 67 open to the bore 63 and the trailer power cylinder 108, and with the vacuum port 66 cut off. With the pedal control valve 116 in the "off" position, as described in connection with Figure 1, atmospheric pressure exists in the conduit 117 and consequently in the tractor power cylinder 107, the port 67 and bore 63 of the relay 38 and the trailer power cylinder 108.

Now, if the hand control lever 121 is moved toward the "on" position, the pressure in conduit 39 and in the controlling pressure chamber 70 of the relay 38 will be reduced so that the plunger 64 of the relay will move to the left, cutting off the air port 67 and opening the vacuum port 66. This admits vacuum to the bore 63 of the relay and to the forward end of the trailer power cylinder 108 to apply the trailer brakes 104. When the vacuum in the bore 63 balances the vacuum in the chamber 70 the relay valve plunger 64 will move into a lapped position in which both of the ports 66 and 67 are cut off. It will be seen, then, that the application of the trailer brakes is proportional to the vacuum transmitted by the hand control valve 37 and consequently that the application of the trailer brakes by the hand lever 121 is perfectly controllable.

If the hand lever 121 is now moved to the "off" position, the hand control valve 37 will admit air to the conduit 39 and chamber 70 of the relay, whereupon the plunger 64 moves to the position of Figure 10, cutting off the vacuum port 66 and admitting air through the port 67 from the conduit 117 to release the trailer brakes 104.

Now, when the foot pedal 124 is depressed to apply both the tractor and the trailer brakes, air is admitted to the conduit 117 and, from one branch of this conduit, it enters the forward end of the tractor power cylinder 107 to apply the tractor brakes and, from the other branch, it enters the port 67 of the relay 381 (which is open, as previously described), and from there enters the trailer power cylinder 108 to apply the trailer brakes.

It is easy to observe that, if both of these systems are operated, both brakes will be properly applied and no difficulty will be encountered.

Figure 5:
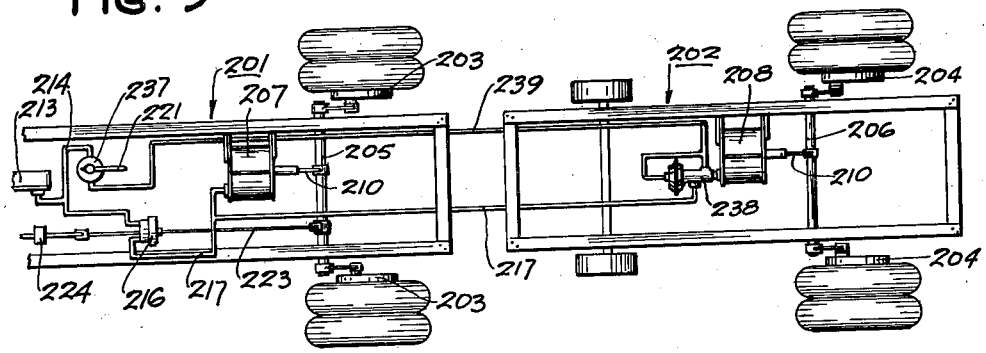
Figure 5 is a view similar to Figure 1 of another modified air-suspended system.

Referring now to Figure 5, there is shown a modified air-suspended system in which corresponding parts have the same reference numerals plus 200, differing from that of Figure 4 only in that the hand control valve controlled pressure line is connected both to the vacuum port 60 of the relay 238 and to the controlling pressure port 71 of the relay 238, and there is no vacuum connection direct to the relay at all.

In operation, when the hand control valve 237 is moved to "on" position, the pressure in the controlled pressure conduit 239 extending therefrom is changed to vacuum which acts on the diaphragm 62 of the relay 238 to shift the plunger to the left and admit the vacuum to the trailer power cylinder 208 through the port 66.

The operation of the brakes by means of the pedal is the same as the modification of Figure 4.

Figure 6:
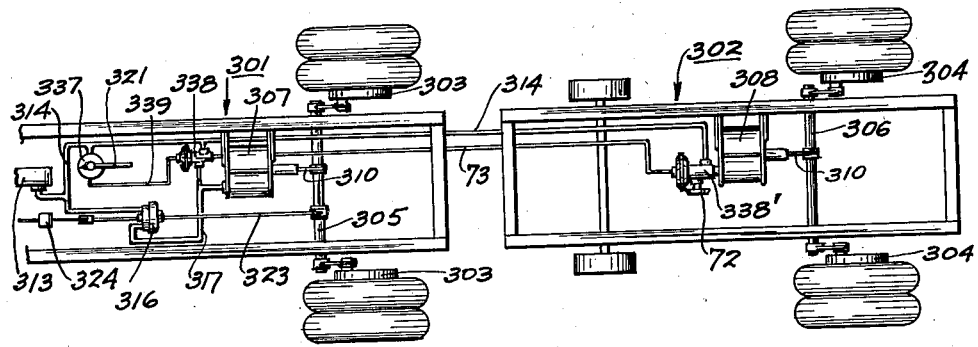
Figure 6 is a view similar to Figure 1 of still another modified air-suspended system.

Referring now to Figure 6, in which similar elements have the same reference numerals plus 300, there is shown another modification in which all the elements of Figure 4 including the relay 338 are positioned on the tractor and a second identical relay 338' is positioned on the trailer power cylinder. This relay 338' has its vacuum port 66 connected to the vacuum conduit 314, its air port 67 connected to an air cleaner 72 and its controlling pressure port 71 connected to a conduit 73 extending from the controlled pressure port 65 of the relay 338.

In this modification, the parts of the relay valve 338' occupy the position of Figure 10 when the control valves 337 or 316 are off, whereby air is admitted through the air cleaner 72 and the port 67 to the trailer power cylinder 308.

Now, when either control valve 337 or 316 is operated, vacuum is admitted to the conduit 73 in exactly the same manner as it is admitted to the cylinder 208 in the modification of Figure 4. This vacuum acts on the relay 338' to shift its plunger 64 to the left and relay the same degree of vacuum directly from the vacuum conduit 314 to the trailer power cylinder 308 to apply the trailer brakes 304.

Figure 7:
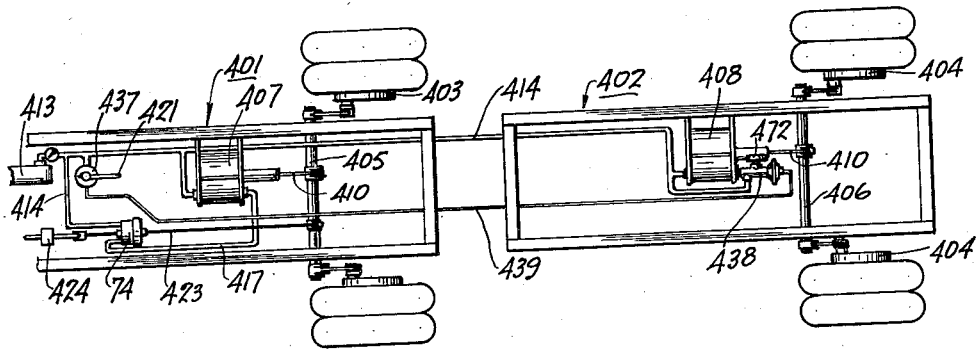
Figure 7 is a view similar to Figure 1 of a vacuum-suspended vacuum power brake system in which a hand lever controls only the trailer brakes and a foot pedal controls only the tractor brakes.

Figure 7 shows a system employing vacuum-suspended power cylinders for operating the tractor and trailer brakes in which only the tractor brakes are applied by a pedal control valve 74, to be subsequently described, and the trailer brakes are applied by a hand control valve 437. In this figure, corresponding parts have the same reference numerals plus 400.

In a vacuum-suspended system, the forward ends of the power cylinders are connected directly to the vacuum conduit at all times, and when the brakes are released, vacuum is present at the rearward end of the cylinders, so that the pressure on both sides of the pistons is equal. To apply the brakes, air is admitted at the rearward ends of the cylinders to push the pistons forward.

In the system of Figure 7, the vacuum conduit 414 is connected to the pedal control valve 74, to the hand control valve 437, to the forward ends of the tractor and trailer power cylinders 407 and 408 and to the vacuum port 66 of a relay valve 438 communicating with the rearward end of the trailer power cylinder 408. The controlled pressure conduit 417 from the pedal control valve 74 communicates with the rearward end of the tractor power cylinder 407, and the controlled pressure conduit 439 from the hand control valve 437 is connected to the controlling pressure port 71 (Figure 10A) of the relay valve 438. The air port 67 of the relay valve 438 communicates with an air cleaner 472.

The relay valve 438 shown in detail in Figure 10A is practically identical in all respects to that of Figure 10 and therefore the same reference numerals increased by 400 have been applied to all its parts. The only difference is that in this valve the spring 464a is positioned between the casing 60 and the plunger 64 so as to maintain the plunger normally in the extreme left-hand position whereby the port 466 is open and the port 467 is cut off.

When used with a vacuum-suspended system, the "off" position of the hand control valve 437 (shown in detail in Figure 12) is the one in which the cam follower 55 is in its uppermost position, whereby the vacuum valve 47 is open to admit vacuum to the controlled pressure conduit 439, and the "on" position is the one in which air is transmitted to the controlled pressure conduit 439 (see previous description of the valve).

Figure 14:
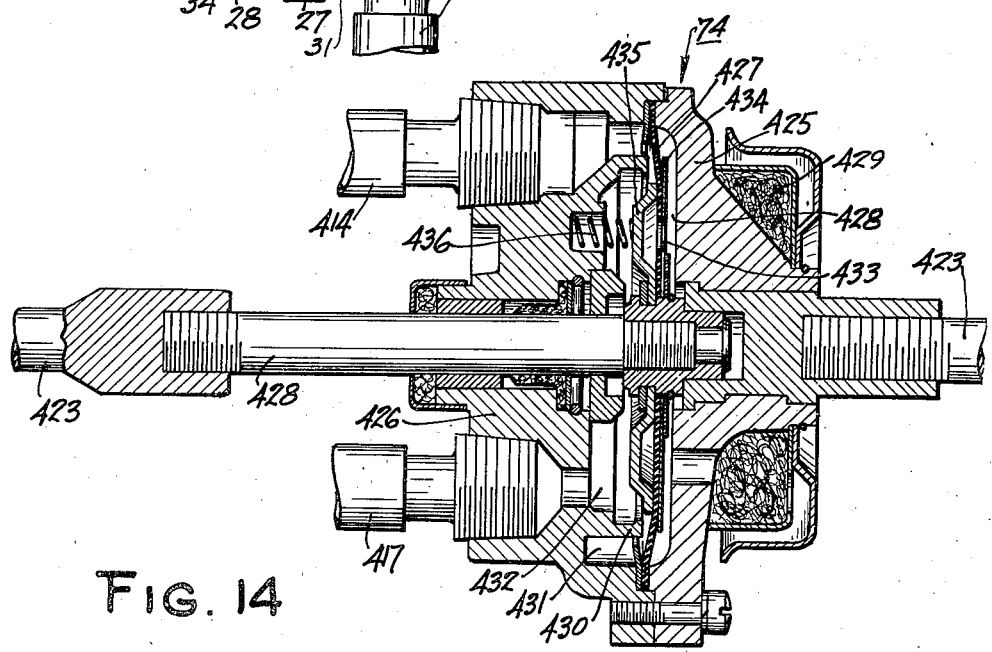
Figure 14 is a central longitudinal section through a vacuum-suspended type pedal control valve suitable for use in the systems of Figures 7, 8 and 9.

The pedal control valve 74 (shown in detail in Figure 14) differs from the valve 16 shown in Figure 13 in that in the "off" position it transmits vacuum and in the "on" position it transmits atmospheric pressure. This is accomplished merely by a substantial fore and aft inversion of the parts, and consequently, the same reference numerals will be employed as used in Figure 13 increased by 400. The casing shell 426 is at the forward end of the valve, and the plunger 428 projects forwardly therethrough. The springs 436 act between the casing shell 426 and the valve disc 435 so that, in released position, the diaphragm 427 is lifted from the annular wall 430, admitting vacuum from the vacuum chamber 431 to the controlled pressure chamber 432.

Whn the pedal 424 is depressed, the springs 436 are compressed, the diaphragm 427 is forced against the annular wall 430 by the valve disc 434 to close off the vacuum, and the valve disc 435 is lifted from the diaphragm to admit air from the air chamber 428, through the perforations 433 in the diaphragm, to the controlled pressure chamber 432.

When the trailer brakes are off, vacuum exists in the conduit 439 causing the relay valve ports to occupy the positions of Figure 10A and admitting vacuum to the rearward end of the trailer power cylinder. When the hand control valve 437 is moved toward "on" position, air is admitted to the conduit 439 and consequently to the controlling pressure chamber 70 of the relay 438, causing the plunger 64 to shift to admit air to the rearward end of the trailer power cylinder 408 through the air port 66 and air cleaner 472 to apply the trailer brakes.

When the foot pedal 424 is depressed, the pedal control valve 74 admits air to the conduit 417 and to the rearward end of the tractor power cylinder 407 to apply the tractor brakes. The usual operation is to apply both tractor and trailer brakes simultaneously by operating the hand lever 421 and the pedal 424 simultaneously. It is often desirable, however, to operate the hand lever 421 slightly in advance of the foot pedal 424 to prevent the trailer from overrunning the tractor.

Figure 8:
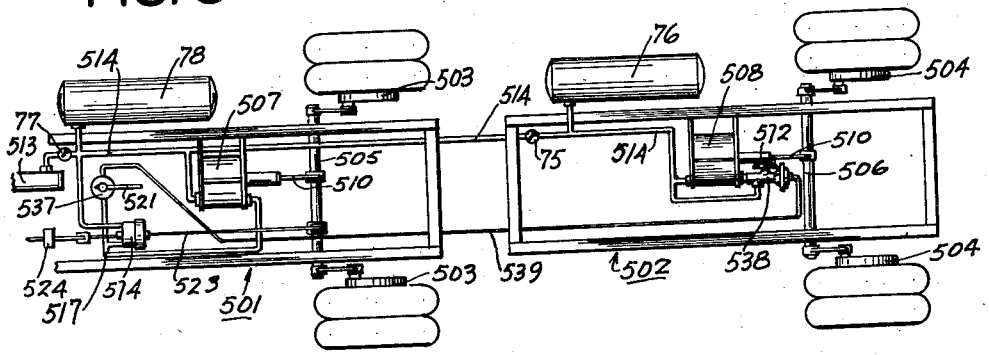
Figure 8 is a view similar to Figure 1 of a modified vacuum-suspended vacuum power brake system in which a hand lever controls the trailer brakes and a foot pedal controls both the tractor and the trailer brakes.

Figure 8 shows a modification of the system of Figure 7 arranged to permit simultaneous operation of the tractor and trailer brakes by means of the foot pedal 524. In this figure, corresponding parts are designated by the same reference numerals plus 500.

In this modification, the hand control valve has its vacuum port 44 (see Figure 12) connected to the controlled pressure conduit 517 extending from the pedal control valve 574 instead of being connected directly to the vacuum conduit 514. There is also provided on the trailer 502 a check valve 75 and a reserve tank 76 which are arranged to apply the brakes of the trailer in the event the trailer should break away from tne tractor. Since the controlled pressure conduit 539 would be broken by such an accident, air would be admitted thereto and the relay 538 would shift to admit air to one end of the cylinder 508, while the vacuum, trapped in the reserve tank 76 by the check valve 75, continues to act on the other end of the trailer power cylinder 508, to apply the trailer brakes. Similarly, a check valve 77 and a reserve tank 78 are provided on the tractor 501 to insure power for braking in the event that the motor should stall.

Since the pedal control valve 574 normally transmits vacuum when in its "off" position, the hand control valve 537 operates in the same way as in the system of Figure 7 to apply the trailer brakes alone.

When the hand control valve 537 is "off" its parts occupy the positions shown in Figure 12 with the vacuum valve 47 lifted from the vacuum port 44. Now, if the pedal control valve 574 is operated by depressing the foot pedal 524, air is admitted to the controlled pressure line 517 to apply the tractor brakes 503 in the same way as was previously described with relation to Figure 7. At the same time, the air will pass into the hand control valve 537 through the port 44, past the open vacuum valve 47 into the controlled pressure chamber 43. From the controlled pressure chamber 43, it, in turn, passes out through the controlled pressure port 52 to the controlled pressure conduit 539 and the relay 538 to operate the relay and apply the trailer brakes as formerly related in the description of the embodiment shown in Figure 7. The air in the conduit 517 also passes through the port 53 of the valve 537 to the chamber 59 so that the pressures on the opposite sides of the diaphragm 42 are balanced and the valve parts do not shift from their original positions.

However, if the hand control lever 521 is now shifted toward the "on" position so that the spring 56 exerts pressure on the diaphragm 42, the diaphragm will move to the left, closing the valve 47 and opening the air port valve 48 to admit sufficient air to balance the additional pressure. Thus the trailer brakes may be applied to a greater degree than the tractor brakes, whereby it will be seen that, by means of my novel system, the driver of the vehicles can proportion the braking between the tractor and trailer to provide the best operation for the particular existing conditions of load and road.

After the brakes have been applied by the foot pedal 524, release of the pedal shifts the pedal control valve 574 to re-admit vacuum to the controlled pressure conduit 517 to withdraw the air from the tractor power cylinder 507 to release the tractor brakes and from the relay 538 through the conduit 539 and the valve 537 to permit the relay to shift to its "off" position (Figure 10A) and re-admit vacuum to the trailer power cylinder 508 to release the trailer brakes.

Referring now to Figure 9, there is shown still another modification of the system of Figure 7 whereby the tractor and trailer brakes operate simultaneously. In the modification corresponding parts have the same reference numerals plus 600.

Referring to the drawings, it will be seen that we have omitted the direct connection from the vacuum conduit 614 to the vacuum port 66 of the relay 638 (see Figure 10A), and have, instead, connected the controlled pressure conduit from the pedal control valve 674 to said vacuum port. The hand control valve is connected and operates in the same manner as in Figure 7 to apply the trailer brakes through the relay 638, and since the relay normally occupies the position of Figure 10A, the operation of the foot control permits air to pass directly through the port 66, the bore 63 and the port 65 of the relay 638 directly to the trailer power cylinder 608 to apply the trailer brakes 604.

While we have described several embodiments of our invention, it is not our intention to be limited to those embodiments or otherwise than by the terms of the appended claims.

What we claim as our invention is:

1. In a tractor and trailer vehicle combination, brakes for the tractor and trailer, power means for actuating the trailer brakes, power means for actuating the tractor brakes, independently operable control means for one of said power means, independently operable control means for actuating both of said power means substantially simultaneously, and a source of power for said two power means having parallel connections extending directly to both of said control means, said first control means having one position for connecting the corresponding one of the parallel connections directly to its said one power means and having another position connecting its said one power means to the second control means whereby both power means are then controlled by said second control means.

2. In a tractor and trailer vehicle combination, brakes for the tractor and trailer, power means for actuating the trailer brakes, power means for actuating the tractor brakes, independently operable control means for one of said power means, independently operable control means for actuating both of said power means substantially simultaneously, a source of power having parallel connections extending to said two control means respectively, and an auxiliary power connection extending from one control means to the other, one of said control means including a valve having a passage therethrough which is open to connect its power means to the other control means through said auxiliary power connection when said one control means is in the "off" position, and the other control means being constructed and arranged to transmit the pressures controlled by it through said passage to operate the last-mentioned one of said power means.

3. In a tractor and trailer vehicle combination, brakes for the tractor and trailer, power means for actuating the trailer brakes, power means for actuating the tractor brakes, independently operable control means for one of said power means, and independently operable control means for actuating both of said power means substantially simultaneously, one of said control means comprising a control valve and a relay valve, the relay valve having a passage therethrough open when the control valve is in "off" position, and the other of said control means being constructed and arranged to transmit the pressures controlled by it through said passage to operate one of said power means.

4. In a tractor and trailer vehicle combination, brakes for the tractor and trailer, power means for actuating the trailer brakes, power means for actuating the tractor brakes, independently operable control means for one of said power means, and independently operable control means for actuating both of said power means substantially simultaneously, one of said control means comprising a control valve and a relay valve, the relay valve having a passage therethrough open when the control valve is in "off" position and closed when the control valve is in "on" position, and said other control means being constructed and arranged to transmit the pressures controlled by it through said passage to operate one of said power means.

5. In a tractor and trailer vehicle combination, brakes for the tractor and trailer, vacuum power means for actuating the trailer brakes, vacuum power means for actuating the tractor brakes, independently operable control means for said trailer brake power means, independently operable control means for actuating both of said power means substantially simultaneously, and an engine on the tractor having an intake manifold and provided with conduit connections extending in parallel directly to both of said control means, one of said control means comprising a valve connected with said other control means and constructed and arranged to transmit the pressures controlled by said other control means when said one control means is in its "off" position.

6. In a tractor and trailer vehicle combination, brakes for the tractor and trailer, power means for actuating the trailer brakes, power means for actuating the tractor brakes, independently operable control means for one of said power means, and independently operable control means for actuating both of said power means substantially simultaneously, one of said power means having a relay valve communicating therewith, a normally open passage through said relay valve, one said control means communicating with said power means through said normally open passage, and the other control means being constructed and arranged to shift said relay valve to close said passage and admit an operating pressure to said power cylinder.

7. In a vehicle, means for controlling a single power cylinder comprising two controls, one of which has a valve having a passage therethrough open when said control is in the "off" position, and the other of which communicates with said power cylinder through said open passage, in combination with a source of fluid power directly connected in parallel to both of said controls.

8. In a vehicle, means for controlling a single power cylinder comprising two control valves and a relay valve, the relay valve having a passage therethrough in the position it occupies when one of said control valves is in the "off" position, and the other of said valves communicating with said power cylinder through said passage.

9. In a tractor and trailer vehicle combination, brakes for the tractor and trailer, power means for actuating the trailer brakes, power means for actuating the tractor brakes, independently operable control means for the power means for actuating the trailer brakes, and independently operable control means for actuating both of said power means substantially simultaneously, one of said control means comprising a control valve and a relay valve, the relay valve having a passage therethrough open when the control valve is in "off" position and closed when the control valve is in "on" position, and the other control means being constructed and arranged to transmit pressures controlled by it through said passage to operate the trailer power means.

10. In a vehicle combination, two sets of brakes, fluid pressure operated power cylinders for each set of brakes, a relay valve having a controlled pressure port connected to one of said power cylinders and a pressure responsive element and a port for admitting a controlling pressure to said pressure responsive element and a pair of pressure differential ports alternately opened and closed by the action of said pressure responsive element, a source of differential pressure connected to one of said pressure differential ports, and a pair of control valves communicating with said source of pressure differential, each of said control valves having a controlled pressure conduit, one of which is connected to said controlling pressure port and the other of which is connected to the other pressure differential port.

11. In a vehicle combination, two sets of brakes, fluid pressure operated power cylinders for each set of brakes, a relay valve having a controlled pressure port connected to one of said power cylinders and a pressure responsive element and a port for admitting a controlling pressure to said pressure responsive element and a pair of pressure differential ports alternately opened and closed by the action of said pressure responsive element, a source of differential pressure connected to one of said pressure differential ports, and a pair of control valves communicating with said source of pressure differential, each of said control valves having a controlled pressure conduit, one of which is connected to said controlling pressure port and the other of which is connected to the other pressure differential port, the controlled pressure conduit from one of said control valves being connected to actuate the other power cylinder.

12. In a vehicle combination, two sets of brakes, fluid pressure operated power cylinders for each set of brakes, a relay valve having a controlled pressure port connected to one of said power cylinders and a pressure responsive element and a port for admitting a controlling pressure to the pressure responsive element and a pair of pressure differential ports alternately opened and closed by the action of said pressure responsive element, a source of differential pressure, a pair of control valves, connected to the source of differential pressure and each having a controlled pressure conduit, one of which is connected to the controlling pressure port of the relay and the other of which is connected to one of said differential pressure ports.

13. In a vehicle combination, two sets of brakes, fluid pressure operated power cylinders for each set of brakes, a relay valve having a controlled port connected to one of said power cylinders and a pressure responsive element and a port for admitting a controlling pressure to the pressure responsive element and a pair of pressure differential ports alternately opened and closed by the action of said pressure responsive element, a source of differential pressure, a pair of control valves, connected to the source of differential pressure and each having a controlled pressure conduit, one of which is connected to the controlling pressure port of the relay and the other of which is connected to one of said differential pressure ports, the controlled pressure conduit from one of the control valves being connected to actuate the other power cylinder.

14. In a power brake system for a tractor vehicle and a trailer vehicle, in combination, brakes for the tractor vehicle, brakes for the trailer vehicle, a power cylinder for operating the tractor brakes, a power cylinder for operating the trailer brakes, a valve arranged to control the brakes of both vehicles simultaneously, and valve means including a relay valve arranged and operable to control the brakes of one vehicle only either under the control of said valve or independently thereof.

15. In a power brake system for a tractor vehicle and a trailer vehicle, in combination, brakes for the tractor vehicle, brakes for the trailer vehicle, a power cylinder for operating the tractor brakes, a power cylinder for operating the trailer brakes, a valve arranged to control the brakes of both vehicles simultaneously, and another valve interposed in a vacuum line between the first named valve and a control for the power cylinder of one vehicle and arranged to control the brakes of said last named vehicle.

16. In a power brake system for a tractor vehicle and a trailer vehicle, in combination, brakes for the tractor vehicle, brakes for the trailer vehicle, a control line for said trailer vehicle, a power cylinder for operating the tractor brakes, a power cylinder for operating the trailer brakes, a valve arranged to control the brakes of both vehicles simultaneously, and a hand operated valve arranged to control the brakes of said trailer vehicle only, and arranged to admit air into said control line or alternately to connect said control line with the first named valve.

17. In a power brake system for a tractor vehicle and a trailer vehicle, in combination, brakes for the tractor vehicle, brakes for the trailer vehicle, a power cylinder for operating the tractor brakes, a power cylinder for operating the trailer brakes, a valve arranged to control the brakes of both vehicles simultaneously, and another valve interposed in a control line between the first named valve and the power cylinder of one vehicle and arranged to control the brakes of said last named vehicle.

18. In a power brake system for a tractor vehicle and a trailer vehicle, in combination, brakes for the tractor vehicle, brakes for the trailer vehicle, a control line for said trailer vehicle, a power cylinder for operating the tractor brakes, a power cylinder for operating the trailer brakes, a valve arranged to control the brakes of both vehicles simultaneously, and a hand operated valve arranged to control the brakes of said trailer vehicle only or alternately to connect said control line with the first named valve.

19. In a power brake system for a tractor vehicle and a trailer vehicle, in combination, brakes for the tractor vehicle, brakes for the trailer vehicle, a power cylinder for operating the tractor brakes, a power cylinder for operating the trailer brakes, a valve arranged to control the brakes of both vehicles simultaneously, and another valve interposed in a control line between the first named valve and a control for the power cylinder of one vehicle and arranged to control the brakes of said last named vehicle.

CALEB S. BRAGG.
ROBERT P. BREESE.

CERTIFICATE OF CORRECTION.

Patent No. 2,215,732. September 24, 1940.

CALEB S. BRAGG, ET AL.

It is hereby certified that error appears in the printed specification of the above numbered patent requiring correction as follows: Page 6, second column, line 26, claim 13, before the word "port" insert --pressure--; and that the said Letters Patent should be read with this correction therein that the same may conform to the record of the case in the Patent Office.

Signed and sealed this 25th day of November, A. D. 1941.

(Seal)

Henry Van Arsdale,
Acting Commissioner of Patents.